Patented Sept. 16, 1924.

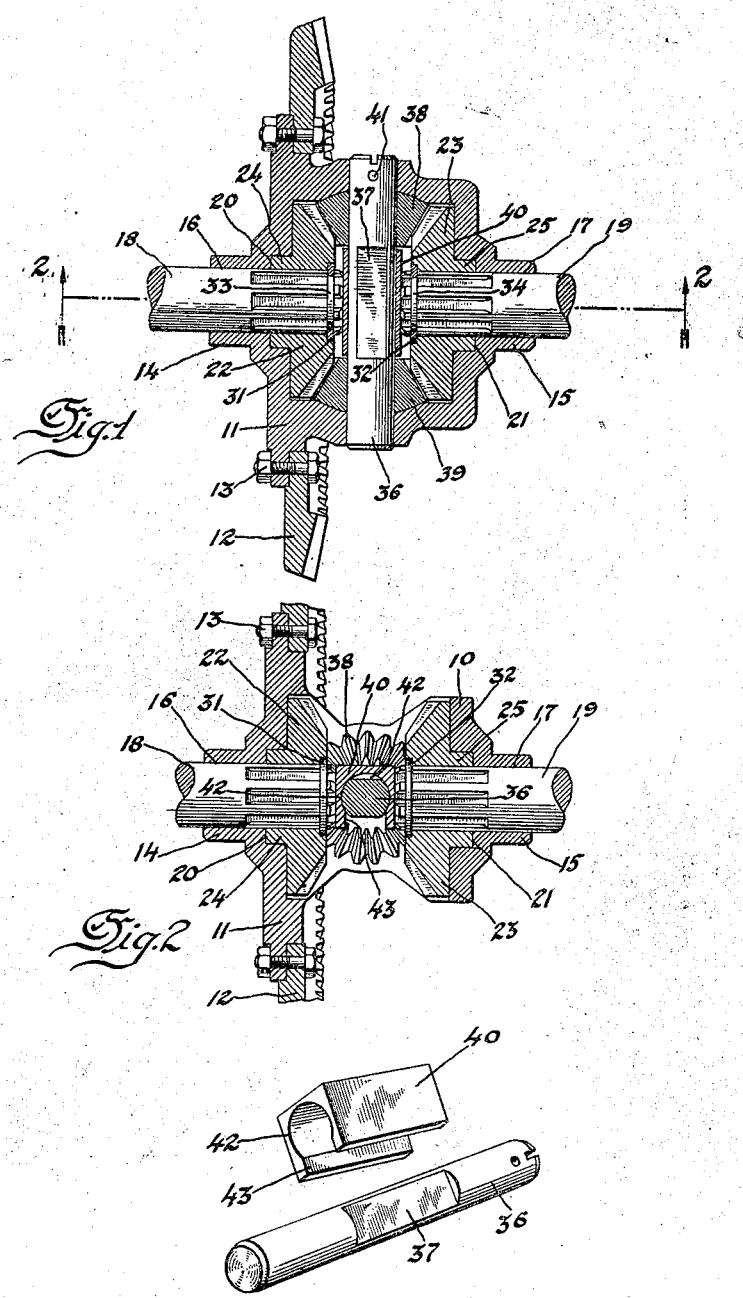

1,508,832

UNITED STATES PATENT OFFICE.

KARL W. ZIMMERSCHIED, OF NEW YORK, N. Y., AND ORMOND E. HUNT, OF DETROIT, MICHIGAN, ASSIGNORS TO GENERAL MOTORS CORPORATION, OF DETROIT, MICHIGAN, A CORPORATION OF DELAWARE.

DIFFERENTIAL MECHANISM.

Application filed August 24, 1922. Serial No. 584,037.

*To all whom it may concern:*

Be it known that we, KARL W. ZIMMERSCHIED and ORMOND E. HUNT, citizens of the United States, and residents of New York, New York, and Detroit, Michigan, respectively, have invented certain new and useful Improvements in Differential Mechanism, of which the following is a full, clear, concise, and exact description, such as will enable others skilled in the art to which the invention relates to make and use the same, reference being made therein to the accompanying drawings, which form a part of this specification.

This invention relates to automobiles and more particularly to differential mechanism therefor.

One of the objects of this invention is the provision of mechanism whereby the retaining means on the inner ends of the axle sections may be removed and the axle sections withdrawn and replaced without the necessity of disassembling the gear mechanism of the differential.

Another object of the invention is the provision of a new and improved differential mechanism assembly that is simple in construction and that may be readily assembled and disassembled. Other and further objects and advantages of the invention will appear as the description proceeds.

On the drawing, Figure 1 is a section of differential assembly with parts broken away.

Figure 2 is a section on line 2—2 of Figure 1.

Figure 3 is a perspective view of the shaft or locking pin and spacer disassembled.

Reference now being had to the drawing, the numeral 10 designates a differential support or gear cage provided with a flange 11 to which is secured the ring gear 12 in any suitable manner as by means of the bolts 13. The differential cage 10 may be and preferably is in the form of an integral yoke, although it is understood that it may be composed of separate pieces. The differential support or gear cage is provided with laterally extending hubs 14 and 15 which are adapted to engage bearings carried by the differential housing in the usual manner. The hubs 14 and 15 are provided with the axial openings 16 and 17 through which the inner ends of the axle sections 18 and 19 are adapted to extend, as is common in such constructions.

The usual side bevel gears 22 and 23 are employed. These gears are provided with hubs 24 and 25 which are journaled in the counterbores 20 and 21 in the openings 16 and 17 in the differential support or gear cage. The side gears are connected to the inner ends of the axle sections in any suitable manner as by means of splines on said sections which are adapted to engage corresponding recesses in the inner peripheries of the openings in the side gears whereby the axle sections are compelled to rotate with the gears but may be slid axially thereof.

Retaining means are provided for preventing the withdrawal of the axle sections. As shown, this means comprises C-shaped spring washers or retaining members 31 and 32 which are adapted to engage the grooves 33 and 34 extending about the inner ends of the axle sections.

The differential support or cage 10 is provided with alined openings extending at right angles to the axle sections and intermediate between the side gears. A shaft or locking pin 36 is adapted to engage the alined openings and to afford journals for the differential pinions 38 and 39 which are rotatably mounted thereon and which are adapted to engage the bevel side gears, in the usual manner. The pin or shaft 36 is provided, between its ends, with a portion having a reduced diameter as at 37, whereby when the shaft is turned to a predetermined position the axle sections may be moved inwardly to permit the removal of the retaining means, as will presently appear. This reduced diameter may be formed by removing a portion of the shaft at opposite sides thereof as shown in Figures 2 and 3 of the drawing.

In the withdrawal of the rear axle sections of automobiles it is common practice to disassemble the differential mechanism in order to remove the axle sections therefrom and especially is this true where the inner ends of the axle sections are provided with retaing means. Mechanism for overcoming this difficulty and which at the same time will provide means for preventing the inward movement of the axle sections, will now be described.

A spacer or thrust block 40 is employed which is provided with two parallel faces against which the inner ends of the axle sections are adapted to abut for limiting the inward movement of said sections. This block is provided with a recess extending longitudinally thereof. This recess is provided with an enlarged portion and a restricted passage or slot in communication therewith. The recess may be C-shaped and may be described as a combined slot and segmental opening. The diameter of the segmental opening or the circular portion 42 of the recess is slightly greater than that of the gear shaft 36 while the width of the slot 43 is only slightly greater than the reduced diameter at 37 of said shaft, whereby the spacer may be placed on the shaft by causing the reduced portion to pass through the slot and may be secured thereon by turning the shaft a quarter turn. The shaft may be provided with a screw driver slot or kerf for turning the same and is held in position by any suitable means such as the pin 41.

It will be noted that when the device is assembled the shaft 36 fills the circular portion 42 of the slot. This is an important feature because by this arrangement the sleeve is afforded a firm support thus preventing any longitudinal movement of either axle section independently of the other.

In removing the axle sections from the differential as shown in Figure 1, the fastening means or pin 41 is first removed after which the shaft 36 may be given a quarter turn which will permit the removal of the spacer sleeve 40. After removing the spacer the axle sections may be moved inwardly against the flat portions of the shaft and the retaining washers 31 and 32 removed after which the axle sections may be withdrawn. By a reverse operation, the axle sections may be assembled and secured in operative position without disarranging or otherwise interfering with the differential mechanism assembly.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

We claim:

1. A differential and rear axle mechanism comprising, in combination, a differential housing, alined axle sections extending into the housing on opposite sides, a pinion shaft supported in the housing at right angles to the axle sections and between their ends, said pinion shaft having a flattened portion opposite the axle sections and terminating in shoulders at opposite ends, a spacer block having a cylindrical bore to receive the pinion shaft and a communicating opening along one side to slide over the flattened portion, the pinion shaft being angularly movable to change the relation of the flattened portion to the side opening of the spacer block, and differential gearing in the housing arranged to prevent removal of the spacer block when the pinion shaft is in its normal angular position.

2. A differential and rear axle mechanism as defined by claim 1, in combination with means to hold the pinion shaft after it has been turned ninety degrees to lock the spacer block in place.

3. A differential and rear axle mechanism as defined by claim 1, in combination with locking devices for the axle sections which are removable and insertible when the spacer block is removed, and which are locked in place to hold the axle sections when the spacer block is in active position straddling the pinion shaft.

4. A two-pinion differential comprising, in combination, a housing open on two opposite sides, alined axle sections extending into the housing, a pinion shaft carried by the housing and extending between the ends of the axle sections, the shaft having opposite flat surfaces forming a portion of reduced thickness, a spacer block C-shaped in cross-section insertible through one open side of the housing to straddle the pinion shaft, means to hold the pinion shaft after it has been turned ninety degrees to prevent removal of the spacer block through either open side of the housing, the axle sections holding the sides of the spacer block at right angles to the open sides of the housing, and differential gearing in the housing.

In testimony whereof we affix our signatures.

KARL W. ZIMMERSCHIED.
ORMOND E. HUNT.